US007199559B2

(12) United States Patent
Yanagi

(10) Patent No.: US 7,199,559 B2
(45) Date of Patent: Apr. 3, 2007

(54) ELECTRIC POWER GENERATING SYSTEM FOR VEHICLE

(75) Inventor: Mitsunori Yanagi, Anjo (JP)

(73) Assignee: Denso Corporation, Kariya (JP)

( * ) Notice: Subject to any disclaimer, the term of this patent is extended or adjusted under 35 U.S.C. 154(b) by 119 days.

(21) Appl. No.: 11/130,198

(22) Filed: May 17, 2005

(65) Prior Publication Data

US 2005/0258807 A1 Nov. 24, 2005

(30) Foreign Application Priority Data

May 18, 2004 (JP) .............................. 2004-147095

(51) Int. Cl.
*H02P 9/10* (2006.01)
*H02J 7/00* (2006.01)

(52) U.S. Cl. .......................... 322/33; 322/28; 322/36; 322/37

(58) Field of Classification Search .................. 322/25, 322/27, 28, 33, 36, 37; 290/46, 50
See application file for complete search history.

(56) References Cited

U.S. PATENT DOCUMENTS 5,160,881 A * 11/1992 Schramm et al. .............. 322/7
5,280,231 A * 1/1994 Kato et al. ..................... 322/28
5,298,842 A * 3/1994 Vanek et al. ................. 318/473
5,298,852 A 3/1994 Meyer
5,374,886 A * 12/1994 Kohl et al. ..................... 322/28
5,548,202 A * 8/1996 Schramm et al. ............. 322/33
5,637,985 A * 6/1997 Kakizaki et al. .............. 322/28
5,982,155 A * 11/1999 Rechdan et al. .............. 322/36
6,184,661 B1 * 2/2001 Becker et al. ................. 322/25
6,809,428 B1 * 10/2004 Blackburn et al. ........ 290/37 R
6,828,701 B1 * 12/2004 Berggren et al. ......... 310/68 C
6,982,545 B2 * 1/2006 Browning et al. ............ 322/33
7,116,081 B2 * 10/2006 Wilson ........................ 322/33

FOREIGN PATENT DOCUMENTS

JP       A-08-009567    1/1996
JP       B2-3159976     2/2001

* cited by examiner

*Primary Examiner*—Nicholas Ponomarenko
(74) *Attorney, Agent, or Firm*—Oliff & Berridge, PLC

(57) ABSTRACT

An electric power generating system for a vehicle includes a generator having a field coil, a voltage regulator, a temperature sensor for sensing temperature of the voltage regulator, a field current restricting circuit that directly restricts field current if temperature of the voltage regulator becomes higher than a maximum level and a device that prevents temperature of the voltage regulator from further rising without directly restricting field current if temperature of the voltage regulator becomes a warning level that is lower than the maximum level.

9 Claims, 4 Drawing Sheets

ELECTRIC POWER GENERATING SYSTEM FOR VEHICLE

CROSS REFERENCE TO RELATED APPLICATION

The present application is based on and claims priority from Japanese Patent Application 2004-147095, filed May 18, 2004, the contents of which are incorporated herein by reference.

BACKGROUND OF THE INVENTION

1. Field of the Invention

The present invention relates to an electric power generating system to supply electric power to a battery or various electric loads that is or are mounted in a vehicle.

2. Description of the Related Art

When temperature of a voltage generator that is built in a vehicle's electric power generator rises up, field current supplied by the voltage regulator to the field coil of the generator is controlled to prevent the temperature from further rising up, as disclosed in JP-A-8-9567 or in JP-B2-3159976.

If the temperature around the voltage regulator rises up, the output power of the generator decreases in case the above temperature control is carried out. This may cause insufficient performance or operation of the electric loads such as head lamps.

SUMMARY OF THE INVENTION

The present invention is to provide an improved electric power generating system. That is, the improved electric power generating system does not significantly decrease the output power even if the ambient temperature of a built-in voltage regulator rises up.

According to an embodiment of the invention, an electric power generating system for a vehicle includes a generator having a field coil, a voltage regulator that includes an overheat control circuit for controlling field current if temperature of the voltage regulator becomes higher than a first threshold value, a temperature sensor that senses temperature of the voltage regulator, cooling means for cooling the voltage regulator and control means for operating the cooling means if temperature of the voltage regulator becomes higher than a second threshold value that is lower than the first threshold value. Therefore, the output power of the generator will not decrease as long as the control means effectively operates the cooling means. In the electric power generating system as described above the cooling means preferably includes a motor-driven cooling fan. The motor-driven cooling fan is preferably disposed near an engine to also cool engine coolant.

According to another embodiment of the invention, an electric power generating system for a vehicle includes a generator having a field coil, a voltage regulator that includes an overheat control circuit that controls field current supplied to the field coil if temperature of the voltage regulator becomes higher than a first threshold value, a temperature sensor that senses temperature of said voltage regulator, and control means that turns off such electric loads that do not affect vehicle driving conditions if temperature of the voltage regulator becomes higher than a second threshold value that is lower than the first threshold value. Therefore, the output power of the generator will not decrease as long as the control means effectively turns off such electric loads. In the above-described embodiment, the electric loads to be turned off may be an audio device or a seat heater.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF THE PREFERRED EMBODIMENTS

Two kinds of electric power generating systems according to preferred embodiments of the present invention will be described with reference to the appended drawings.

An electric power generating system for a vehicle according to the first embodiment of the invention will be described with reference to FIGS. 1 and 2.

Figure 1:
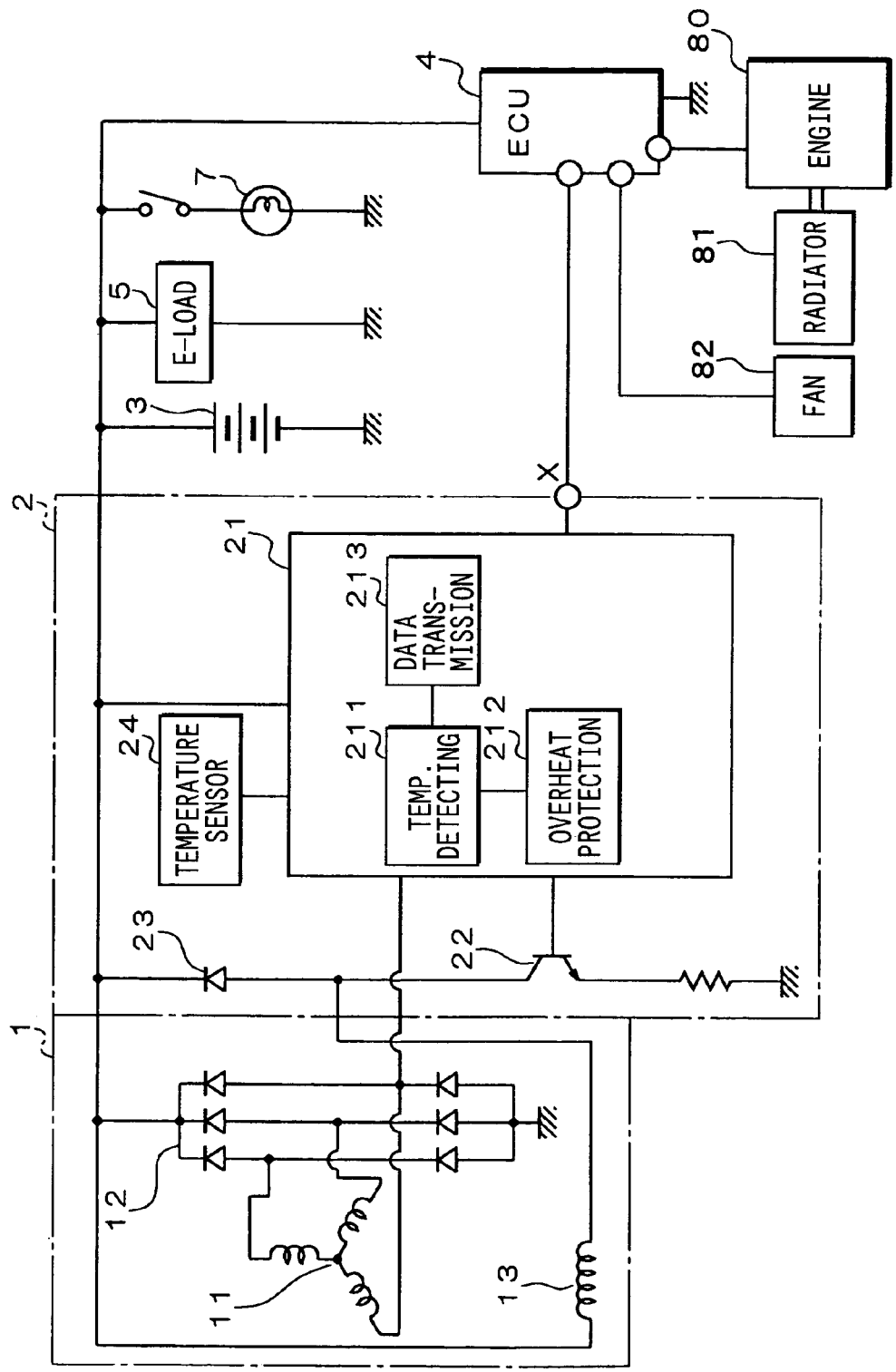
FIG. 1 is a block diagram of an electric power generating system according to the first embodiment of the invention.
Figure 2:
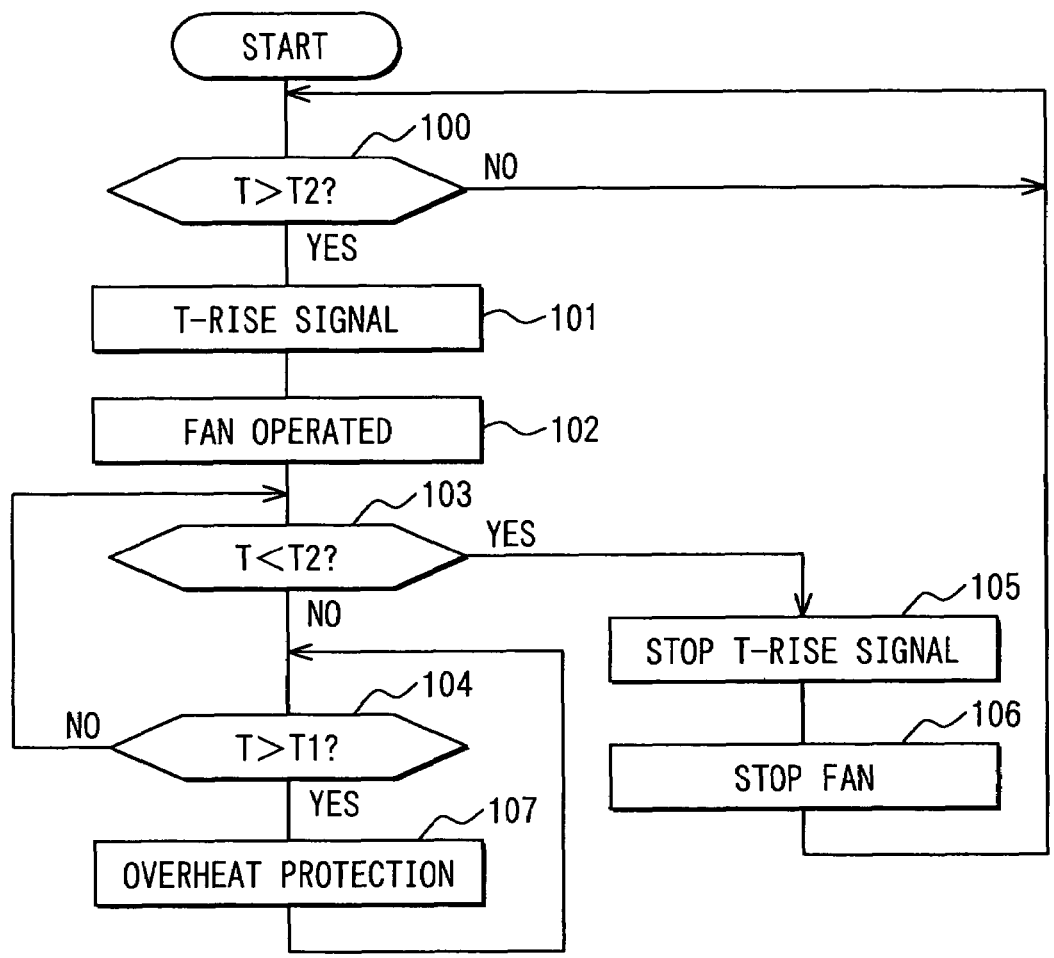
FIG. 2 is a flow diagram of operation of the electric power generating system according to the first embodiment of the invention.

As shown in FIG. 1, the power generating system according to the first embodiment includes a vehicle's electric power generator (hereinafter referred to the generator) 1, a voltage regulator 2, an on-vehicle battery 3, an engine control unit (hereinafter referred to as the ECU) 4, an electric load 5, a head lamp 7, etc. The ECU 4 connects to an engine 80 and a motor-driven cooling fan 82 that cools the engine 80.

The generator 1 has a stator core on which three-phase stator winding 11 is mounted, a three-phase full-wave rectifying unit 12 and a rotor on which a field coil 13 is mounted. The output voltage of the generator 1 is controlled by the voltage regulator 2 that switches on or off field current supplied to the field coil 13 in a controlled manner. The generator 1 is connected to the battery 3 at its output terminals to charge the battery 3. The battery 3 connects to the ECU 4, the electric load 5 and the head lamp 7.

The voltage regulator 2 controls the field current supplied to the generator so that the output voltage of the generator 1 becomes a predetermined voltage. The voltage regulator 2 includes a control circuit 21, power transistor 22, a flywheel diode 23, a temperature sensor 24, etc. The control circuit 21 turns on or off the power transistor 22 so that the output voltage of the generator 1 can be the same voltage level as the predetermined voltage. The control circuit 21 includes a temperature detecting circuit 211, an overheat protecting circuit 212 and a data transmission circuit 213. The control circuit 21 detects temperature of the voltage regulator 2, sends temperature data to the ECU 4 and controls the field current according to the temperature. The temperature detecting circuit 211 detects the temperature of the voltage regulator 2 with the temperature sensor 24, which is disposed inside the voltage regulator 2. The temperature detecting circuit 211 has two output terminals S1, S2 respectively connected to the overheat protecting circuit 212 and the data transmission circuit 213. If the detected temperature T becomes higher than a first threshold value T1, the output terminal S1 provides a high level signal. If the detected temperature T becomes higher than a second threshold value T2 that is lower than the first threshold value, the output terminal S2 of the temperature detecting circuit 211 provides a high level signal. In other words, if the temperature of the voltage regulator 2 continuously rises up after the generator 1 starts generating electric power, the signal of the output terminal S2 changes from a low level signal to a high level signal. Then, the signal of the other output terminal S1 changes from a low level signal to a high level signal while the output terminal S2 maintains the high level signal.

If the output terminal S1 of the temperature detecting circuit 211 provides a high level signal, the overheat protection circuit 212 controls or reduces the field current supplied to the field coil 13. If the output terminal S2 of the temperature detecting circuit 211 provides a high level signal, the data transmission circuit 213 sends a temperature rise signal to the ECU 4 via a terminal X. These signals are maintained continuously or cyclically until the temperature T detected by the temperature detecting circuit 211 becomes lower than the second threshold value T2, and the signal of the output terminal S2 of the temperature detecting circuit 211 comes back to a low level signal.

The power transistor 22 is connected in series with the field coil 13 of the generator 1. The field current is supplied to the field coil 13 when the control circuit 21 turns on the power transistor 22. When the field current is to be reduced, the overheat protection circuit 212 reduces the duty ratio of the field current control signal applied to the power transistor. The flywheel diode 23 is connected in parallel with the field coil 13 to pass the field current when the power transistor 22 is turned off.

The ECU 4 is an outside unit that controls the operation of the engine 80 according to a depressing amount of an accelerator pedal (not shown here) and operates the motor-driven cooling fan 82 to cool engine coolant if the temperature of the engine coolant becomes higher than a predetermined value. The ECU 4 also turns on the motor-driven cooling fan 82 when a temperature rise signal is sent from the terminal X of the voltage regulator 2. The ECU 4 is empowered by the battery 3 like the electric load 4 and the head lamp 7.

The generator 1 and the voltage regulator 2 are directly fixed to the engine via fixing members. When the motor-driven fan 82 is operated in order to cool the coolant flowing into the radiator 81, a portion of air that is introduced to spaces around the engine is further supplied to spaces around the generator 1 and the voltage regulator 2. Thus, the motor-driven fan 82 functions to cool the voltage regulator 2.

The control operation of the electric power generating system according to the first embodiment will be described with reference to a flow diagram shown in FIG. 2.

When the engine 80 starts and the generator 1 and the voltage regulator 2 start their operation, the temperature detecting circuit 211 of the control circuit 21, whether the temperature T indicated by the temperature sensor 24 is higher than the second threshold value T2 or not is examined at step 100. If the result is NO, the above step is repeated. If the result is YES, the output terminal S2 of the temperature detecting circuit 211 provides a high level signal, so that the data transmission circuit 213 sends a temperature rise signal to the ECU 4 via the terminal X at step 101. When the ECU 4 receives the temperature rise signal, it operates the motor-driven cooling fan 82 at step 102. Therefore, outside air is introduced into the spaces around the engine 80 through the radiator 82.

Then, the temperature detecting circuit 211 examines whether the temperature T returns to a temperature lower than the second threshold value T2 or not at step 103. If the temperature T is still higher than the second threshold value T2, NO is provided. Next, the temperature detecting circuit 211 further examines whether the temperature T becomes higher than the first threshold value T1 or not at step 104. If the temperature T is higher than the second threshold value T2 and lower than the first threshold value T1, No is provided and the control operation goes to step 103.

After the motor-driven cooling fan 82 is operated, the temperature T may gradually drop and become lower than the second threshold value T2. In that case, YES is provided at step 103. Then, the data signal that has been sent from the data transmission circuit 213 to the ECU 4 is stopped at step 105. Accordingly, the ECU 4 stops operation of the motor-driven cooling fan 82 at step 106, and the control operation returns to step 100.

If the temperature T rises up to a temperature higher than the first threshold value T1 even though the motor-driven cooling fan 82 is operated, YES is provided at step 104. In that case, the output terminal S1 of the temperature detecting circuit 211 provides a high level signal, so that the overheat protection circuit 212 limits the field current at step 107. Thereafter, the control operation returns to step 104.

Thus, the motor-driven cooling fan 82 is operated before the temperature becomes higher than the first threshold value T1 at which the overheat protection circuit 212 starts to limit the field current. Therefore, the output power of the generator does not decrease even if the temperature gradually rises.

Usually, the generator 1 and the voltage regulator 2 are disposed near the engine 80. Therefore, the voltage regulator 2 is effectively cooled when the motor-driven cooling 82 takes air into spaces around the engine 80 to cool the radiator 81 and the engine 80, thereby reducing radiant heat thereof.

An electric power generating system for a vehicle according to the second embodiment of the invention will be described with reference to FIGS. 3 and 4.

Figure 3:
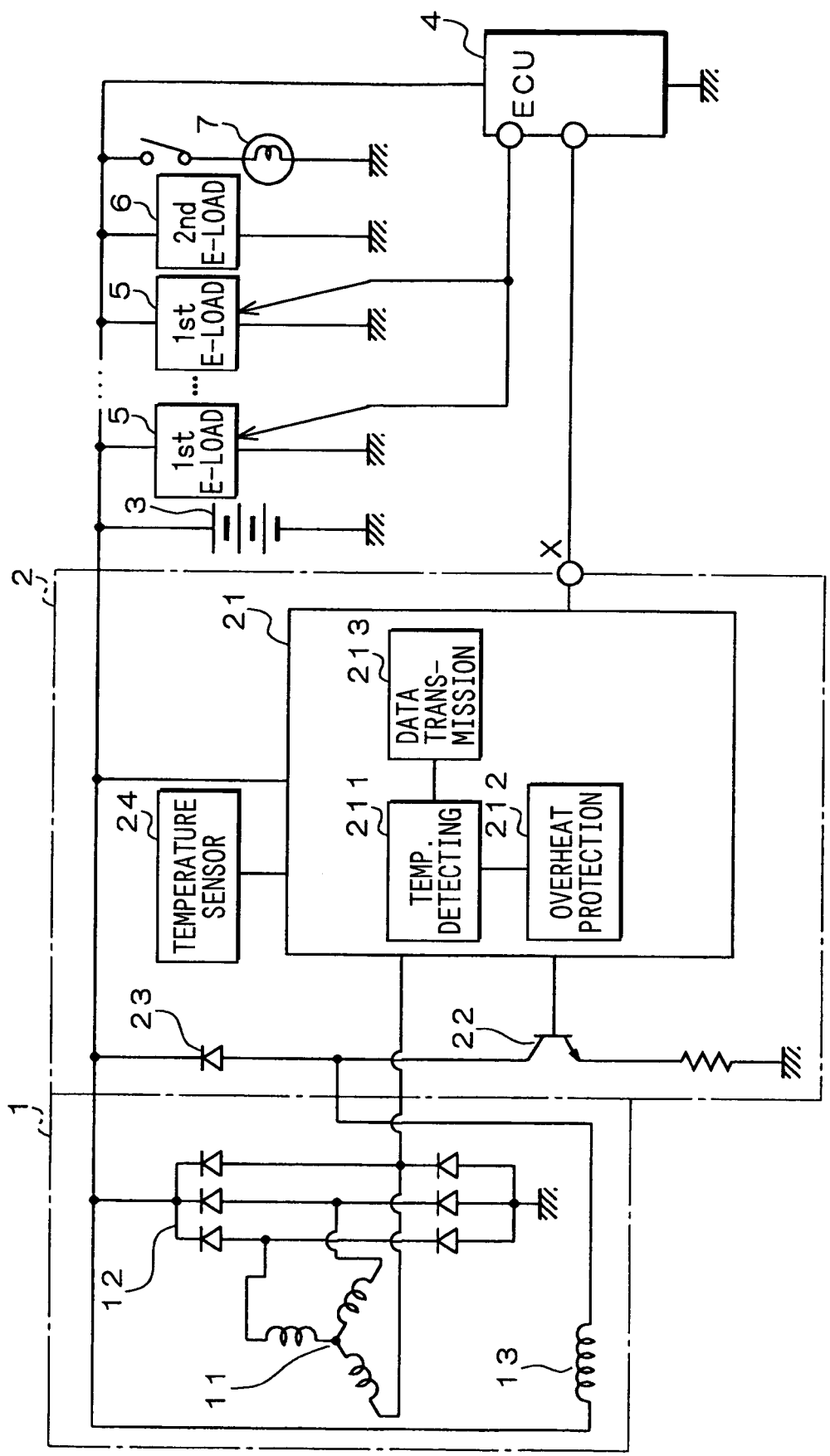
FIG. 3 is a block diagram of an electric power generating system according to the second embodiment of the invention.
Figure 4:
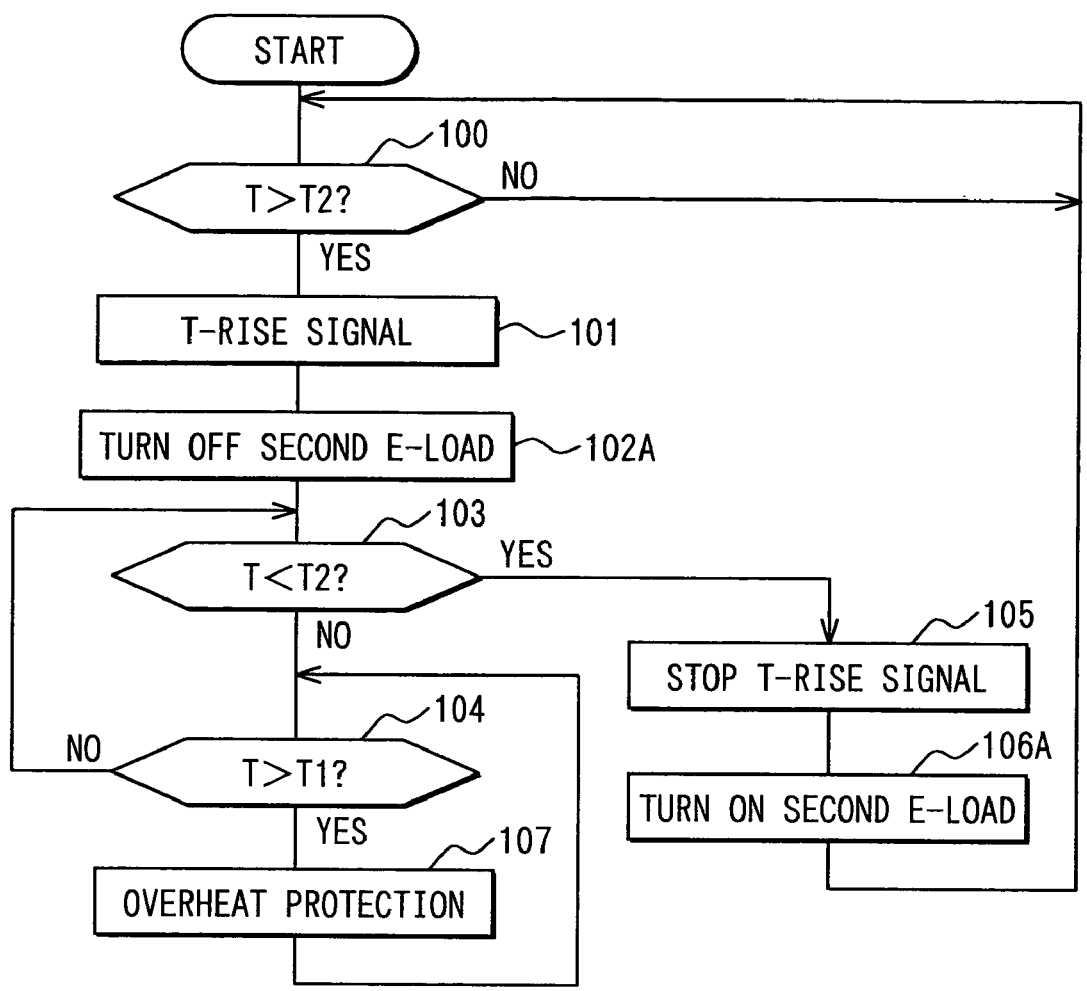
FIG. 4 is a flow diagram of operation of the electric power generating system according to the second embodiment of the invention.

As shown in FIG. 3, the power generating system according to the second embodiment includes a vehicle's electric power generator (hereinafter referred to as the generator) 1, a voltage regulator 2, an on-vehicle battery 3, an engine control unit (hereinafter referred to as the ECU) 4, a first electric load 5, such as an audio device or a seat heater, which does not relate to or affect vehicle driving conditions, a second electric load 6, such as a head lamp 7 or the ECU 4, which may affect vehicle driving conditions, etc. Incidentally, the same reference numeral represents the same or substantially the same part, component or step as presented in the above description and drawings.

The ECU 4 is different in function from that of the first embodiment. The ECU 4 turns off the second electric load 5 when it receives a temperature rise signal from the voltage regulator 2 and turns on the second electric load when it does not receive the temperature rise signal.

A portion of the control operation of the electric power generating system according to the second embodiment that is different from the operation of the first embodiment will be described with reference to a flow diagram shown in FIG. 4.

When the ECU 4 receives the temperature rise signal from the voltage regulator 2, it sends a stop signal to the first electric load 5 to turn off at step 102A. The ECU 4 may turn off a switch connected between the electric load 5 and a power source. When the voltage regulator 2 stops the temperature rise signal at step 105, the ECU 4 turns on the electric load 5 at step 106A.

Thus, the field current is reduced without affecting vehicle driving conditions before the temperature becomes higher than the first threshold value T1 at which the overheat protection circuit 212 starts to limit the field current. Therefore, the output power of the generator does not decrease even if the ambient temperature gradually rises.

It is possible to employ an additional cooling fan to exclusively cool the voltage regulator 2 in substantially the same manner as the above-described motor driven cooling fan 82 for the radiator 81. The temperature sensor 24 that is disposed in the voltage regulator 2 can be disposed outside the voltage regulator 1.

In the foregoing description of the present invention, the invention has been disclosed with reference to specific embodiments thereof. It will, however, be evident that various modifications and changes may be made to the specific embodiments of the present invention without departing from the scope of the invention as set forth in the appended claims. Accordingly, the description of the present invention is to be regarded in an illustrative, rather than a restrictive, sense.

What is claimed is:

1. An electric power generating system for a vehicle comprising:
    a generator including a field coil;
    a voltage regulator for controlling output voltage of said generator, said voltage including an overheat control circuit for controlling field current supplied to the field coil if temperature of said voltage regulator becomes higher than a first threshold value;
    a temperature sensor for sensing temperature of said voltage regulator;
    cooling means for cooling said voltage regulator; and
    control means for operating said cooling means if temperature of said voltage regulator becomes higher than a second threshold value that is lower than the first threshold value.

2. The electric power generating system as claimed in claim 1,
    wherein said cooling means comprises a motor-driven cooling fan.

3. The electric power generating system as claimed in claim 2,
    wherein said motor-driven cooling fan is disposed near an engine to also cool engine coolant.

4. An electric power generating system for a vehicle comprising:
    a generator including a field coil;
    a voltage regulator for controlling output voltage of said generator, said voltage including an overheat control circuit for controlling field current supplied to the field coil if temperature of said voltage regulator becomes higher than a first threshold value;
    a temperature sensor for sensing temperature of said voltage regulator;
    a plurality of electric loads connected to said generator; and
    control means for turning off a portion of said plurality of electric loads if temperature of said voltage regulator becomes higher than a second threshold value that is lower than the first threshold value.

5. The electric power generating system as claimed in claim 4,
    wherein said portion of said plurality of electric loads comprises an electric load that does not directly affect a vehicle driving condition.

6. The electric power generating system as claimed in claim 5,
    wherein said portion of said plurality of electric loads comprises one of an audio device and a seat heater.

7. An electric power generating system for a vehicle comprising:
    a generator including a field coil;
    a voltage regulator for controlling output voltage of said generator;
    a temperature sensor for sensing temperature of said voltage regulator;
    first means, connected to said voltage regulator and said temperature sensor, for directly restricting field current supplied to the field coil if temperature of said voltage regulator becomes higher than a first threshold value; and
    second means, connected to said temperature sensor, for preventing temperature of said voltage regulator from further rising without directly restricting field current if temperature of said voltage regulator becomes higher than a second threshold value that is lower than the first threshold value.

8. The electric power generating system as claimed in claim 7,
    wherein said second means comprises a motor-driven cooling fan that cools said voltage regulator when the temperature of said voltage regulator becomes higher than the second threshold value.

9. The electric power generating system as claimed in claim 7,
    wherein said second means comprises means for turning off an electric load if temperature of said voltage regulator becomes higher than the second threshold value.

* * * * *